(12) United States Patent
Marshall

(10) Patent No.: US 7,492,439 B1
(45) Date of Patent: Feb. 17, 2009

(54) LIQUID CRYSTAL DEVICES ESPECIALLY FOR USE IN LIQUID CRYSTAL POINT DIFFRACTION INTERFEROMETER SYSTEMS

(75) Inventor: Kenneth L. Marshall, Rochester, NY (US)

(73) Assignee: The University of Rochester, Rochester, NY (US)

( * ) Notice: Subject to any disclaimer, the term of this patent is extended or adjusted under 35 U.S.C. 154(b) by 510 days.

(21) Appl. No.: 10/945,753

(22) Filed: Sep. 21, 2004

(51) Int. Cl.
*G02F 1/13* (2006.01)
(52) U.S. Cl. .................................................. 349/201
(58) Field of Classification Search ................ 356/521; 349/106, 168, 89, 201, 202
See application file for complete search history.

(56) References Cited

U.S. PATENT DOCUMENTS

| | | | |
|---|---|---|---|
| 4,451,122 A * | 5/1984 | Oh et al. | 349/138 |
| 4,729,640 A * | 3/1988 | Sakata | 349/201 |
| 5,689,314 A * | 11/1997 | Mercer | 349/1 |
| 5,835,217 A | 11/1998 | Medecki | |
| 7,106,456 B1 * | 9/2006 | Cottrell | 356/521 |

OTHER PUBLICATIONS

Mercer, C. et al., Liquid-crystal point-diffraction interferometer, Optics Letters, vol. 19, No. 12, pp. 916-917, 1994.
Mercer, C. et al., Liquid-crystal point-diffraction interferometer for wave-front measurements, Applied Optics, vol. 35, No. 10, pp. 1633-1642, 1996.
Marshall, K. et al., Recent advances in the development of phase-shifting liquid crystal interferometers for visible and near-IR applications, Proceedings of SPIE vol. 5188 Advanced Characterization Techniques for Optics, Semiconductors, and Nanotechnologies, pp. 48-60, Aug. 3-5, 2003.

* cited by examiner

*Primary Examiner*—Hwa (Andrew) S Lee
(74) *Attorney, Agent, or Firm*—Kenneth J. Lukacher; Martin Lukacher

(57) ABSTRACT

Liquid crystal point diffraction interferometer (LCPDI) systems that can provide real-time, phase-shifting interferograms that are useful in the characterization of static optical properties (wavefront aberrations, lensing, or wedge) in optical elements or dynamic, time-resolved events (temperature fluctuations and gradients, motion) in physical systems use improved LCPDI cells that employ a "structured" substrate or substrates in which the structural features are produced by thin film deposition or photo resist processing to provide a diffractive element that is an integral part of the cell substrate (s). The LC material used in the device may be doped with a "contrast-compensated" mixture of positive and negative dichroic dyes.

14 Claims, 7 Drawing Sheets

LIQUID CRYSTAL DEVICES ESPECIALLY FOR USE IN LIQUID CRYSTAL POINT DIFFRACTION INTERFEROMETER SYSTEMS

The United States Government has certain rights in this invention pursuant to Cooperative Agreement No. DE-FC03-92SF19460 between the U.S. Department of Energy and the University of Rochester and also Agreement No. NAG3-2348 between the University of Rochester and the National Aeronautics and Space Administration (NASA).

The present invention relates to liquid crystal (LC) devices and particularly to those devices that are used as the active modulation element in a liquid crystal phase-shifting point diffraction interferometer (LCPDI). These modulation elements are constructed to permit a reference beam and an object beam traversing a common optical path to induce a pattern of interference fringes. By addressing the LCPDI modulator with an electric field, the phase delay between the object and reference beams can be changed in real time. The invention provides for (1) an improved device design to both maximize optical performance and enhance ease of manufacturing in production-scale quantities, and (2) such devices having mixtures of positive and negative dichroic dyes blended into the liquid crystal material to form a "contrast-compensated", non-dichroic mixture that functions to attenuate the sample beam without the voltage-dependent changes in interference fringe contrast that normally occur when standard dichroic dyes are doped into a LC mixture.

The present invention provides as modulation elements LCPDI cells of compact size (less than 1 in.×1 in.×¼ in.). A principal feature of the invention is to provide LCPDI cells with near solid-state robustness provided by structured substrates where the diffractive element and the substrates are integral with each other. These structured substrates are prepared in accordance with the invention either by thin-film vapor deposition of an inorganic material or by photo resist processing techniques such as are used in making microelectronic components. LCPDI cells made in accordance with the invention maintain all of the advantages of conventional phase shifting liquid crystal point diffraction modulator elements heretofore proposed in the prior art while at the same time allowing much less complexity in assembly and at a lower manufacturing cost. LCPDI systems embodying the invention are particularly applicable for interferometry applications where mechanical vibrations, temperature fluctuations, air turbulence, and stringent size and power requirements would normally preclude effective interferometric measurements. Such interferometry applications include static characterization applications such as wavefront quality analysis in large, high peak-power laser systems like those found in inertial confinement fusion (ICF) experiments, as well as dynamic (time resolved) fluid physics experiments (e.g., thermocapillary flow, nucleate boiling, diffusion of miscible fluids, and onset of flow turbulence and instabilities) that would be conducted both on the ground and in extraterrestrial (earth-orbit) environments such as aboard the International Space Station.

Point diffraction interferometers (PDI's) that have heretofore been suggested are common path interferometers wherein an object beam is focused onto a pinhole in a neutral density filter. The pinhole diffracts the center portion of the beam forming a reference beam that travels collinearly with an attenuated object beam. See, for example, U.S. Pat. No. 5,835,217, issued to H. Medecki et al. on Nov. 10, 1998. The PDI described by Medecki et al., as do all other conventional PDI's, are not capable of phase-shifting interferometry because they are completely composed of solid-state, non-tunable optical materials. The LCPDI is a type of point diffraction interferometer that is capable of phase-shifting interferometry because it replaces the non-tunable, solid-state neutral density filter with a pinhole, with a cell containing microsphere immersed in a thin layer of liquid crystal material. The liquid crystals are both birefringent and electrically addressable so that the phase of the object beam can be controlled relative to the reference beam by applying a controlled electric field across the liquid crystal layer. Such LCPDI's are described in U.S. Pat. No. 5,689,314, issued Nov. 18, 1997 to C. R. Mercer. The LCPDI described in the Mercer patent is also the subject of an article by C. R. Mercer and K. Creath, Optics Letters, Vol. 19, No. 12, Jun. 15, 1994, starting at page 916.

The present invention enables robust and practical LCPDI devices to be made at much lower cost than the devices described in the Mercer patent and article referenced above. Inasmuch as the Mercer LCPDI devices rely on glass or plastic microspheres, such devices are difficult to manufacture and have required the microspheres to be placed on the substrates of the device by hand while observing the placement with a high-power microscope. The microspheres are held in place principally by surface static charges and can easily dislocate and scratch the walls of the substrates that confine the liquid crystal material unless exceptionally great care is taken during the assembly process. The microspheres are also subject to particle contamination and may contain air bubbles that can produce spatial noise in the interferometer (fringe) data. Because the microsphere must be compressed tightly between the opposing substrate walls to insure good fringe contrast in resulting devices, they are prone to fracturing if the contacting pressure during assembly is too excessive.

It is a principal feature of the invention to avoid the highly labor-intensive processes, low yield and quality problems discussed above. In an LCPDI device provided by the invention, the hand-deposited microspheres are replaced with reference diffracting elements that are an integral part of the substrate of the liquid crystal cell. The methods used to provide such structured substrates may be similar to methodology used in microelectronics manufacture, such as vapor deposited inorganic thin films, and photolithographic patterning of photo resist, such as a spin-deposited photosensitive polymer. Spacers that separate the facing surfaces of the cell so as to form a cavity to hold the thin liquid crystal layer may, like the diffracting element, be integral with a substrate. A conductive layer, for example, of indium-tin oxide (ITO) may be integral with the substrate and also with the diffractive elements and spacers. Alignment coatings, composed preferably of a polymer in which the preferred liquid crystal alignment direction is generated photochemically utilizing polarized light, may be located over the spacers and diffracting element and the areas of the substrate therebetween. The LCPDI cells can be assembled by forming a "sandwich" contacting one structured substrate with spacers and another, non-structured (plain) substrate, where the liquid crystal confining surfaces of both substrates have a base conductive material and are overcoated with an alignment coating. Alternatively, the cell may be formed using an identical pair of structured substrates, both containing (1) a base conductive coating, (2) diffractive elements and spacers structurally integral therewith, and (3) an alignment layer overcoating. These two identical structured substrate pairs can be sandwiched together so as to capture the liquid crystal material.

Another drawback of LCPDI devices heretofore proposed, as in the above-identified Mercer patent and article, is the dichroism of the attenuating "guest" dyes mixed with the liquid crystal "host". In order to provide a dye mixture that attenuates the object beam in the interferometer so as to balance the object and reference beams with no appreciable electric field-induced dichroism, the invention provides for mixtures of dyes with positive and negative dichroism that can be tailored to function at several different spectral wavelength regions.

Further information as to background of this invention, including drawbacks arising from the use of microspheres and of features provided by this invention, are contained in an article by the inventor hereof and others which appeared in the Proceedings of a conference sponsored by the SPIE on Advanced Characterization Techniques for Optics, Semiconductors and Nano-technology, Aug. 3-5, 2003 in San Diego, Calif., USA. The article in the proceedings is entitled "Recent Advances in the Development of Phase-Shifting Liquid Crystal Interferometers For Visible and Near-IR Applications" and starts at page 48 of the Proceedings. The article was published in November, 2003.

The foregoing and other features, advantages and objects of the invention will become more apparent from a reading of the following description in connection with the accompanying drawings in which:

FIG. 1A is an enlarged, sectional view of the cell shown in FIG. 1;

Figure 3:
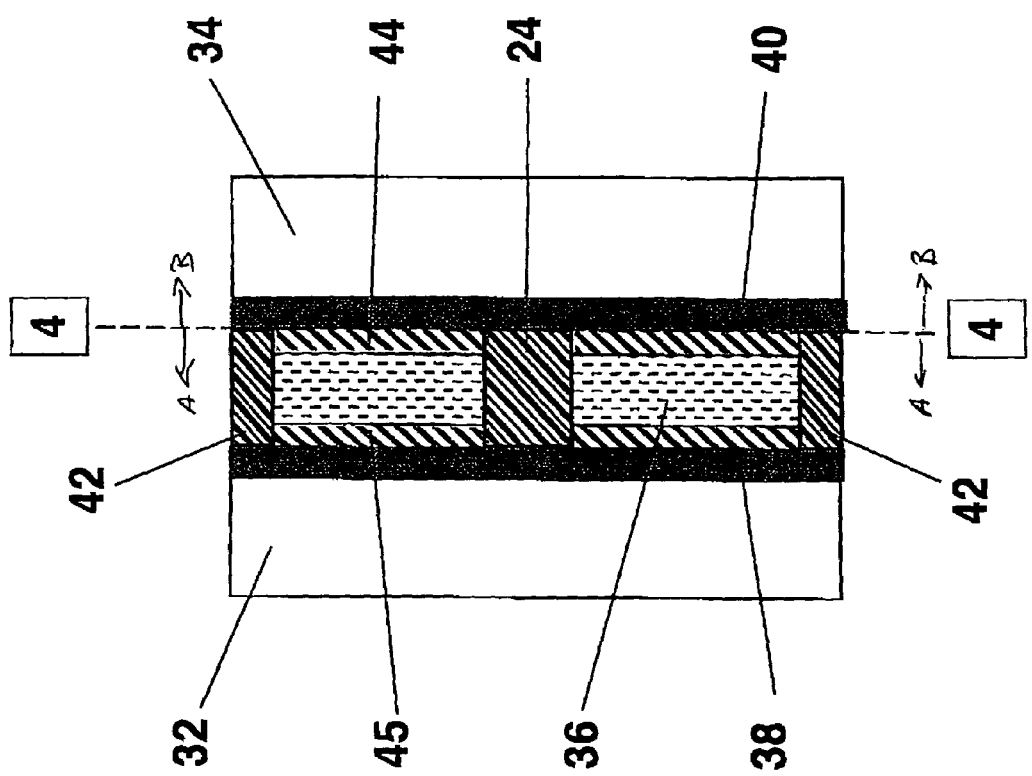
FIG. 3 is a cross-sectional view of a LCPDI cell including a structured substrate having a diffractive element and cell spacers integral with the substrate.
Figure 4:
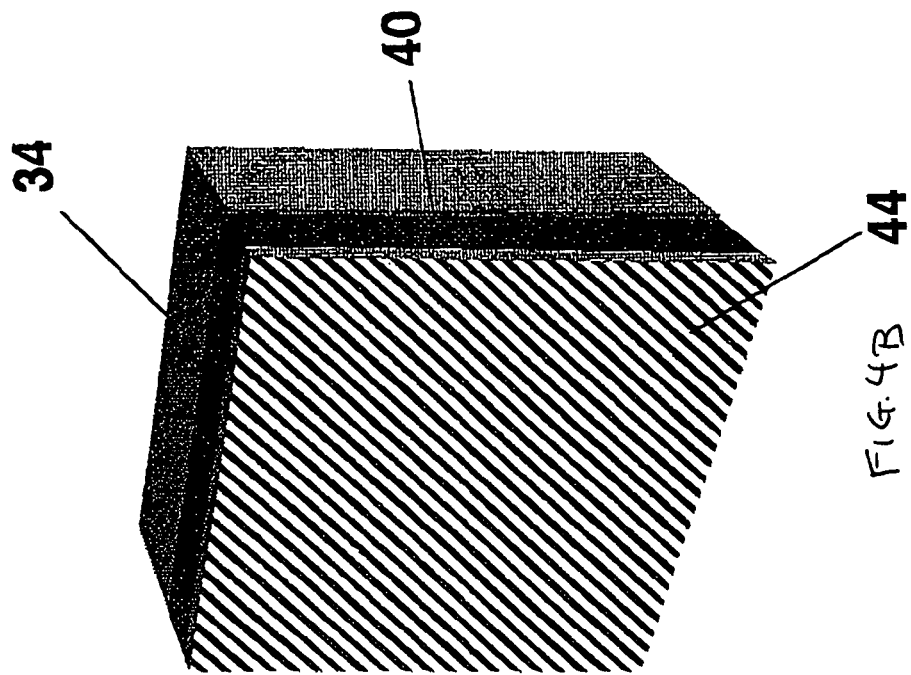
FIGS. 4A and 4B are sectional views through the cell shown in FIG. 3 along the lines 4-4 A and B in FIG. 3, respectively.
Figure 4:
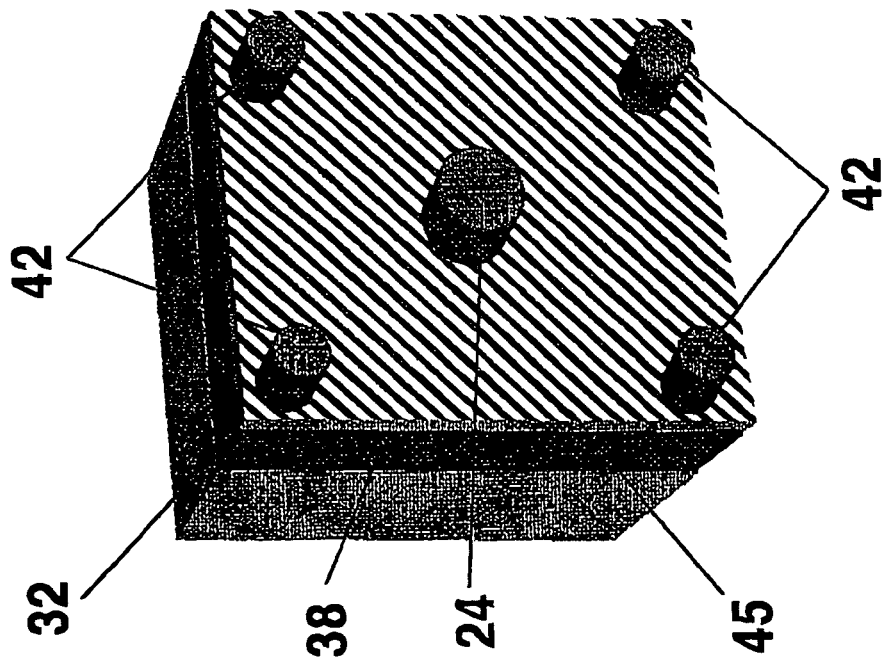
Figure 5:
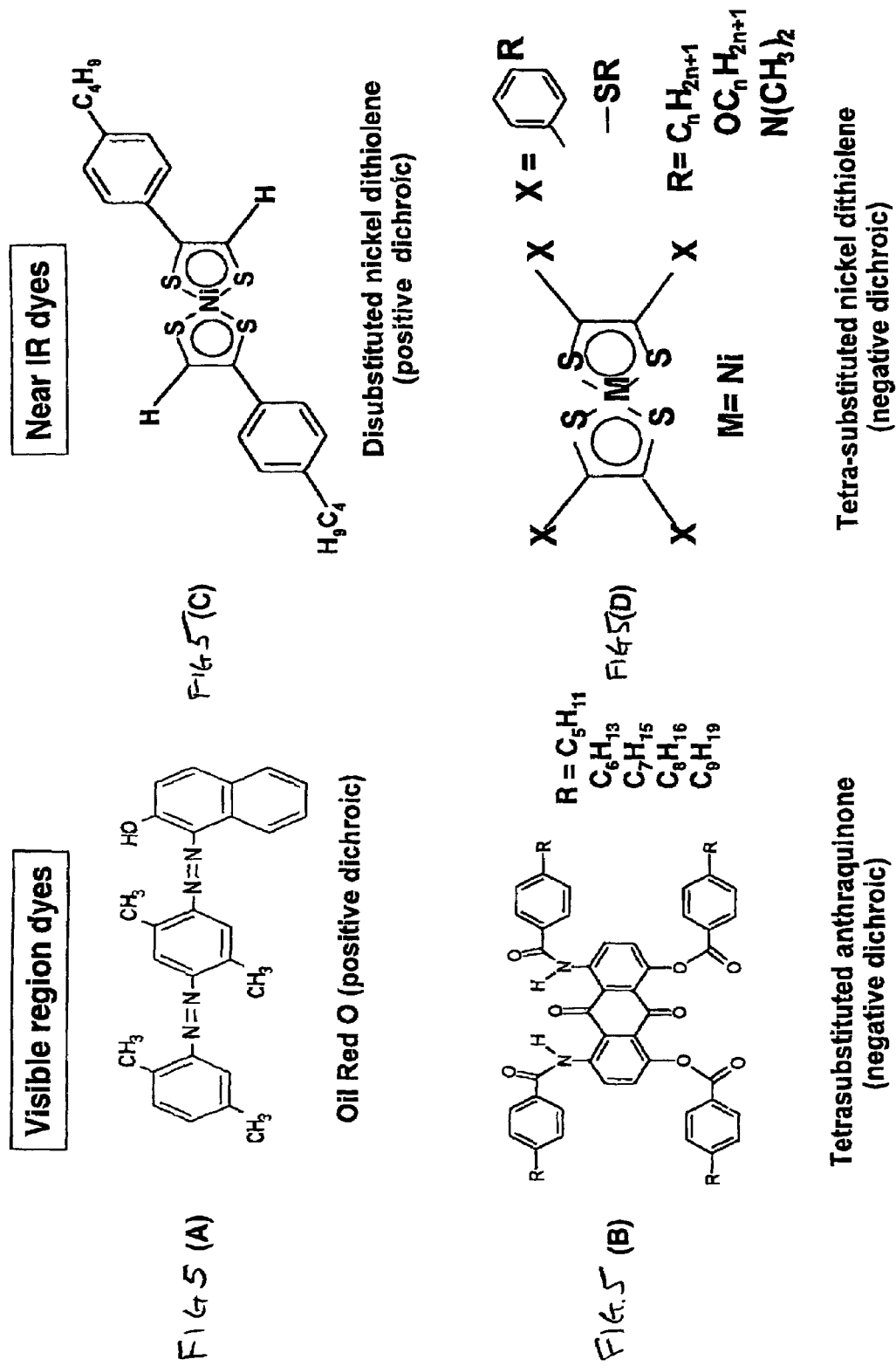
Figure 6:
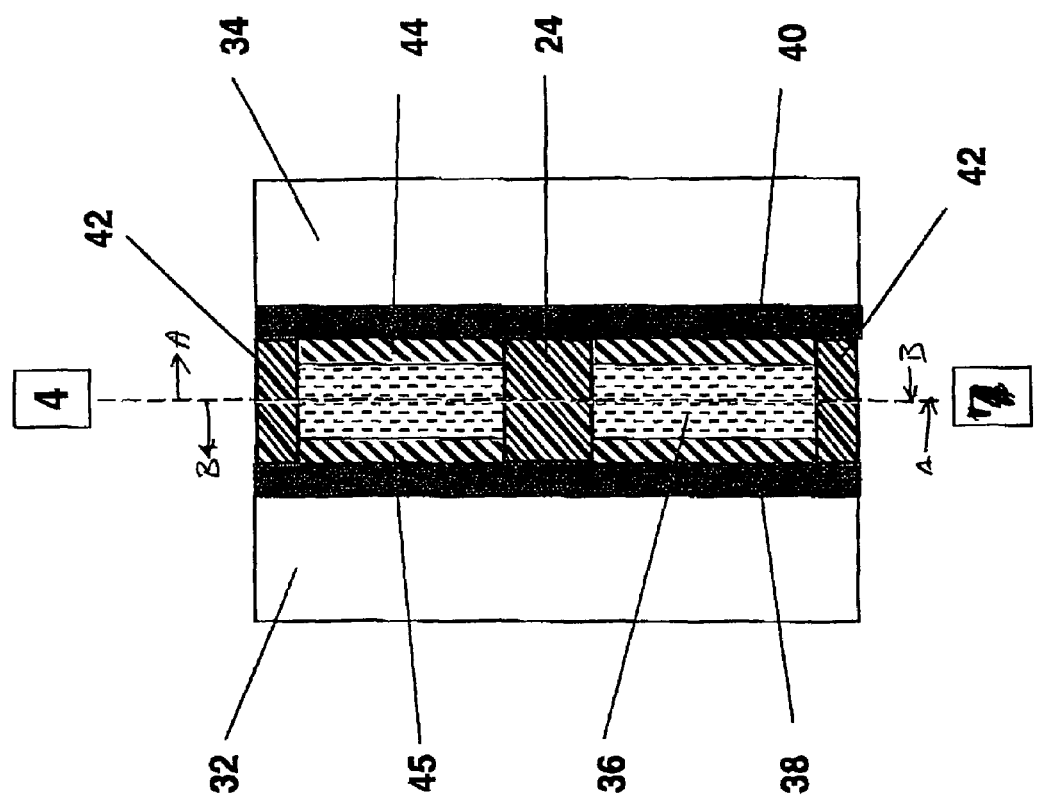
Figure 7:
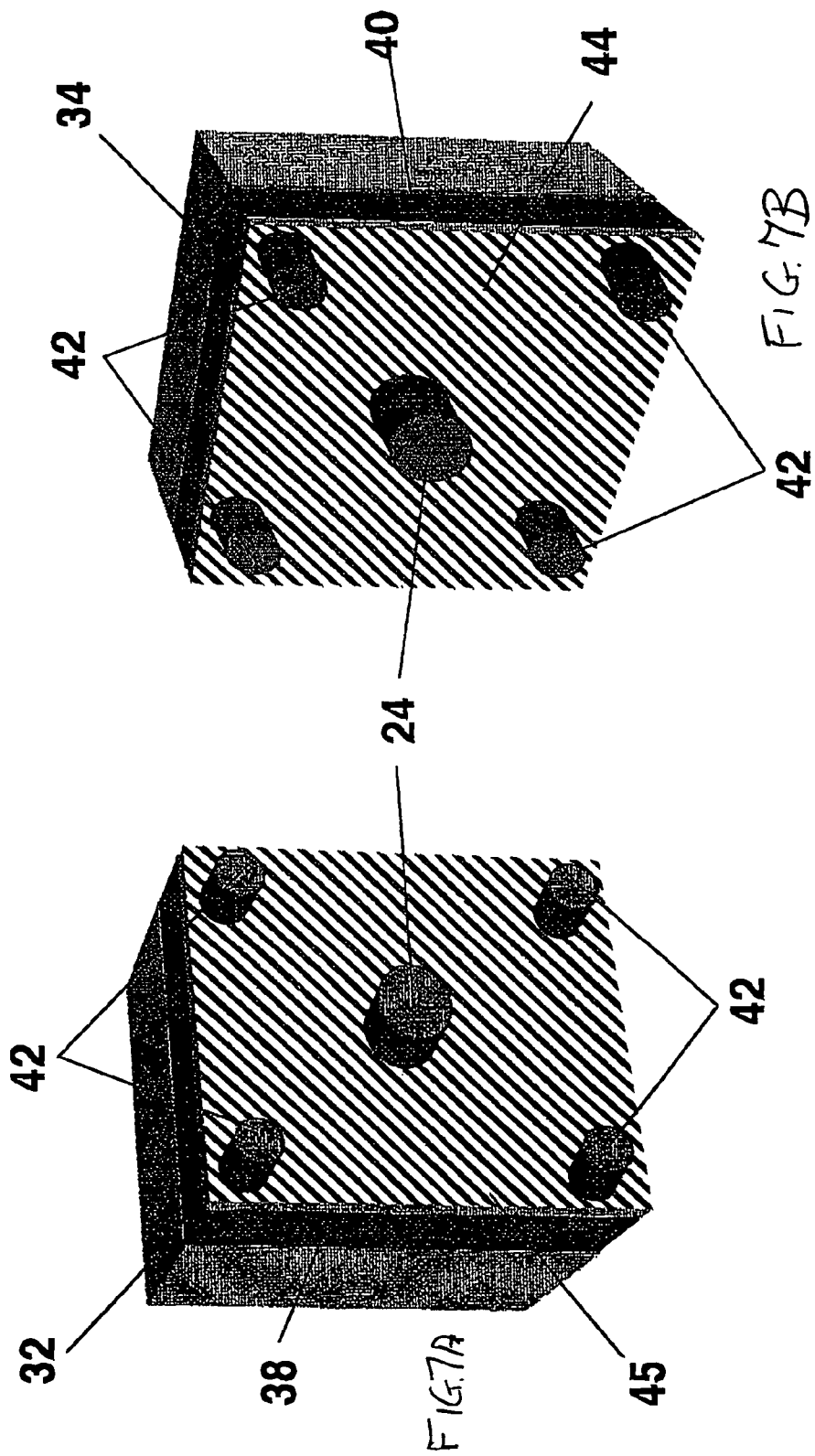

FIGS. 5A, 5B, 5C, and 5D are molecular structure diagrams of dichroic dyes used in contrast-compensated dye-doped mixtures for the LCPDI illustrated in FIGS. 3 and 4; and FIGS. 6, 7A and 7B are sectional views similar to those shown in FIGS. 3, 4A and 4B, respectively of an LCPDI cell having a pair of structured substrates sandwiched together to form a gap between the substrates for the liquid crystal and dye blend mixture in which the gap may be wider than in the LCPDI cell illustrated in FIGS. 3 and 4.

Figure 1:
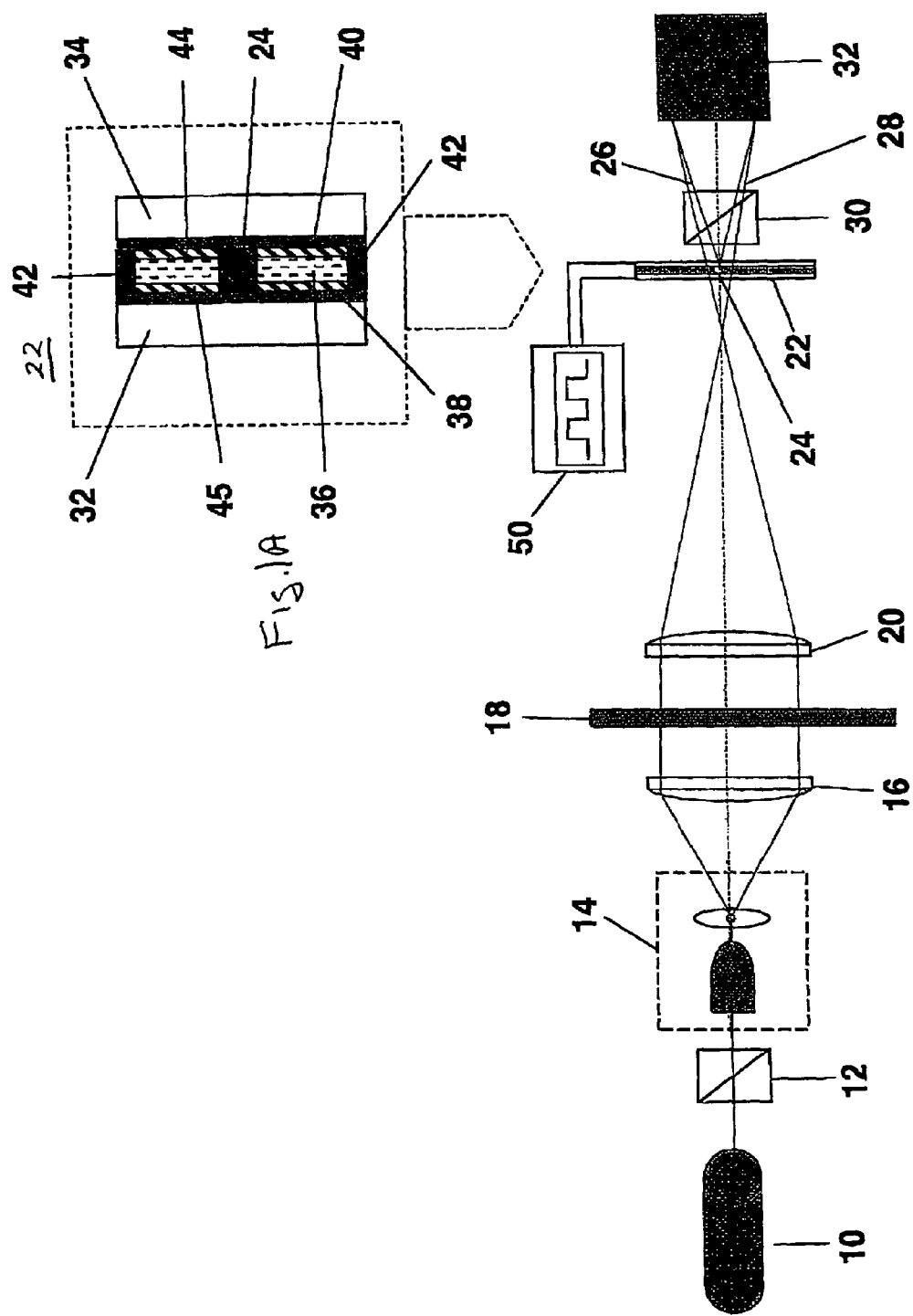
FIG. 1 is a block diagram of an interferometer system including a LCPDI cell provided by the invention.

Referring more particularly to FIG. 1, there is shown an LCPDI system having a laser source 10 for producing a polarized beam of light. The laser source could be a gas laser for the visible region, such as a helium-neon or argon ion laser, or a solid-state glass laser (Nd YAG or Nd YLF) for the near-IR region. The beam from laser source 10 passes through a polarizer 12 to remove any residual unpolarized light and then a spatial filter 14 of conventional design, for example a filter having two lenses that focus the beam at a pinhole and then collects the light from the pinhole into a beam. The spatially filtered beam from spatial filter 14 is incident on a convex collimating lens 16. The lens 16 produces a beam of collimated light that passes through an object under test, such as an optical element (e.g., a lens) that produces an aberrated wavefront. The object under test is indicated generically as a sample 18. The wavefront from the sample 18 is focused by another convex focusing lens 20, preferably ahead of an LCPDI cell (or device) 22 provided by the invention. This cell 22 has a structured substrate providing a diffracting element 24. The light passing through the diffracting element 24 produces the reference beam 26, while the portion of the wavefront that passes around the diffracting element 22 provides the object beam 28. The interference product of these two beams 26 and 28 are passed through a second polarizer 30 to eliminate scattered light produced by passing through the LCPDI cell 22 and is incident on an imaging device, such as a CCD camera 32, which detects the fringe pattern. The fringe pattern may be analyzed by conventional fringe pattern analyzing techniques to characterize the aberrations in the sample 18. The polarizers 12 and 30 are generally used for optimal performance but can be eliminated if (a) the laser beam has a very high degree of polarization, and (b) the LCPDI cell has a very high degree of molecular alignment.

The cell 22 has substrates 32 and 34 (see FIG. 1A); the inner surfaces of which are spaced from each other to define the gap 36 containing the liquid crystal material doped with the attenuating dye mixture. The substrate material can be any optical material that is transparent in the operating wavelength of interest (e.g., fused silica or glass for the UV, visible, and near IR regions).

The attenuating dye mixture is added to the liquid crystal host material in order to balance the intensity of the reference and object beams 26 and 28, respectively. A conventional liquid crystal host material that is transparent at the operating wavelength of interest may be used such as, for example, Merck E7, which is a commercial room-temperature nematic liquid crystal (LC) mixture of cyanobiphenyl and cyanoterphenyl compounds with relatively high birefringence, large positive dielectric anisotropy and a broad nematic phase range. Equal intensity in both the object and reference beams of the LCPDI cell results in well-defined, high-contrast fringes in the interference pattern. Preferably, an optical density between 1.8 and 2.5 for the portion of the beam passing through the LC layer (the object beam) is desired.

When the attenuating dyes have large absorption dichroism, the fringe contrast in the interference pattern does not remain constant over the operating range (phase shifting or index change range) of the cell 22. Dyes that have been used in typical liquid crystal applications (e.g., in information display) produce a large and mainly positive dichroic ratio. Dyes having no appreciable dichroism to date have not been available, particularly dyes that have sufficient solubility in the liquid crystal host. All such dyes exhibit some degree of dichroism as a function of their molecular structures. A single dye with totally nonexistent dichroism would in any event be expensive, time-consuming and labor-intensive to develop. Accordingly, the LCPDI cell 22 uses, in accordance with the invention, dyes with positive and negative dichroism in appropriate ratios in the LC host to compensate for changes in absorption with applied voltage and to present the requisite optical density (OD) over the operating voltage range of the cell 22. For operation with visible region gas lasers such as helium-neon or argon ion lasers, specifically at 543 nm, such suitable positive dichroic dyes are Oil Red O, shown in FIG. 5A, or Sudan III (not shown), while suitable negative dichroic dyes include tetrasubstituted anthraquinone dye shown generically in FIG. 5B. These tetrasubstituted anthraquionones may be synthesized by combining 1,8-diamino-4,5-dihydroxyanthraquinone with the appropriate acid chloride using synthesis techniques known in the art. A commercially available textile dye, Orasol Red, that shows strong negative dichroism and good solubility in liquid crystals can also be used as a component of the dye mixture, but is not a very desirable choice because it both substantially increases the conductivity of the liquid crystal host (which produces field-induced scattering) but also destabilized the LC alignment in LCPCI cells after extended periods of time.

For operation in the near IR region around 1 μm using, for example, solid-state glass lasers, such as NdYAG or NdYLF, suitable contrast-compensated dye mixtures can be formed using combinations of organometallic dyes based on zerovalent transition metal dithiolenes with various terminal substituents. The central metal atom can be either nickel, palladium, or platinum, with nickel generally being the preferred metal due to the relative ease of synthesis of the nickel derivatives. FIGS. 5C and 5D show the structures of these materials with nickel as the central metal atom. The synthesis of these materials may be in accordance with methods known in the art.

Returning to the LCPDI device 22, it may be generally rectangular in outline and of compact size, typically a square of less than 1 in.×1 in. along adjacent sides for easy fabrication. Even more compact devices with much smaller dimensions can be made, as dictated by the application, with the appropriate fabrication fixtures and tooling.

The substrate 32 and 34 are coated on their inside surfaces with a layer of indium-tin oxide (ITO) conductive coating that are, for example, approximately 200-Å (angstrom) thick. This ITO coating provides electrodes 38 and 40 of the cell to which voltage is applied from a computer controlled voltage source such the LCPDI modulator driver and control electronics package represented as 50 in FIG. 1. The voltage may be an alternating current voltage, such as a square wave on which a secondary waveform, such as a sine wave, is superimposed. The voltage maybe varied from 0 to 12 volts in order to orient the molecules of the LC material in the cell 22 so as to obtain in real-time the desired refractive index and phase shift of the object beam as it passes through the cell 22.

The diffractive element 24 and cell-spacers 42 are made integral with at least one of the substrates 32 or 34. The diffractive element 24 may be a circular feature of, for example, 30 to 100 microns (micrometers-μm) in diameter and have a thickness ranging from 5 to 22. Suitable gap spacing ranges are from a minimum of 8-12 μm to a maximum of around 20-25 μm, limited at both extremes by the absorbance capability of the dye mixture. A cell spacing of 22 μm is presently preferred for the LC host and dye mixtures discussed herein.

The integral diffractive element 24 and cell spacers 42 may be provided by vapor depositing the spacers and diffractive element by conventional thin film deposition techniques using silicon monoxide (SiO), but preferably tantalum pentoxide ($Ta_2O_5$). Alternatively, the diffractive element 24 and the spacers 42 may be deposited as circular features composed of a negative photo resist material of the requisite thickness, e.g., 22 micron. A photo resist material which is transparent in the region of the light produced by the laser 10 is desirable. For visible light produce by a helium-neon or argon ion gas laser, a suitable transparent photo resist may be Microposit SU-2010. It may be desirable, as shown in FIGS. 6, 7A and 7B, to deposit the spacers and diffracting object at one-half the desired cell gap thickness (e.g., 11 microns) on both substrates 32 and 34 to achieve the desired total cell gap thickness of 22 μm. In this case, visible registration marks must be provided on substrates 32 and 34 so that they can be accurately assembled to provide a device with composite spacers and a composite diffracting element. The assembly process may occur under a microscope to aid in accurate alignment of the registration marks.

An LCPDI cell as shown in FIGS. 3, 4A and 4B having one structured substrate with the diffractive element and spacers made integral therewith through the use of the photo resist technique provides significant advantages. The photoresist process affords simplicity of assembly, since there is no need for accurate registration of two separate diffractive elements on two different substrates. This simplicity translates into reductions in manufacturing costs. Additionally, the photoresist process allows for the accurate control of the cross-sectional profile of the diffractive element and may be preferable to using the thin-film evaporative process, in view of the advantages of the protoresist process discussed above.

The shape of the spacers 42 and the diffractive element 24 may be obtained by suitable masks, which in the case of both the vapor-deposition process and the photo resist process define the areas occupied by the diffractive element as well as their geometric shape. The dielectric material (e.g., SiO or $Ta_2O_5$) is vapor-deposited under vacuum through the opening in the mask to produce the inorganic diffractive element and spacers on top of the ITO-coated substrate surface. In the case of the photoresist deposition process, the exposed area of the negative photoresist material is crosslinked and made insoluble, while the unexposed (masked) areas remain soluble and can be washed away using a photoresist developer solution to leave the integral spacer and diffractive element on the substrate over the ITO conductive coating.

The following examples set forth the steps for making the structured substrates using the photo resist technique:

In a Class 100 clean room environment, substrates pre-coated with a layer of ITO are cleaned using an ultrasonic bath and detergent solution, followed by rinsing with high-purity deionized water and drying using a hot plate. Each substrate was placed on a spin coater and the substrate surface is flooded with SU-8 2010 photo resist (approx. 8 ml). The flooded substrate was spun at for 90 seconds in increasing steps of 100 RPM/sec to a maximum of 1000 RPM. The substrate was removed from the spin coated and a first-stage soft bake on a hot plate set at 65° C. was done for 60 seconds. A second-stage soft bake was accomplished by baking for an additional 15 minutes at 90° C. The two-stage soft-bake process improves the uniformity of the photoresist layer. The photoresist layer was exposed through a mask using 170 mJ/cm$^2$ of 365 nm UV light. After exposure, a post-bake at 90° C. for 7 minutes was performed using a hot plate. A relaxation period of 10 minutes was allowed before beginning the developing process. The unexposed areas of the photoresist layer were developed (removed) using a puddle development method with negative photoresist developer in a small dish for 3 minutes. The residual unreacted photoresist and developer are removed by rinsing in deionized water and the structured substrate was ready for use after a final hard-bake step on a hot plate set at on 150° C. for 3 minutes.

The following steps may be used to provide the structured substrates using a dielectric evaporation technique:

Glass samples, pre-coated with indium-tin-oxide (ITO), are placed on a 25 μm-thick aluminum foil held in a machined aluminum fixture with four 4 mm (millimeter) apertures and one (1) 9.5 mm aperture. Approximately in the center of the 9.5 mm aperture, the foil has a precision-drilled hole approximating the size of the structural feature to be evaporated (in this example, 100 μm). This fixture was placed directly above the coating source in a 28 inch electron-beam evaporation system with an 8 centimeter (cm) ion source. The fixture masks the surface of the ITO-coated glass such that the resulting deposition consists of four large areas, which are imprecise in horizontal extent but accurately space the two substrates of the liquid crystal cell vertically due to the coating thickness, and one 100 μm coated region for the actual operation of the LCPDI device.

The sample was mounted in the fixture and loaded into a coating chamber, the chamber was evacuated to less than $2\times10^{-6}$ torr and heated to 200° C. The surface to be coated was pre-cleaned for 5 minutes by an argon ion laser beam using a flow of 12.5 sccm of argon gas with ion source beam parameters of 70 mA at 260 V, with a neutralizer wire operating at 14.5 A to provide electrons to the ion beam. Gas flow to the ion source was changed to a mixture of 7 sccm of argon and 15 sccm of oxygen, the beam current was increased to 110 mA and deposition of tantalum-pentoxide ($Ta_2O_5$) was begun. The depostion rate was controlled by a quartz-crystal monitor in a feedback loop with the electron-beam power supply in order to maintain a deposition rate of approximately 4 angstroms/second. A single-wavelength optical monitor operating in transmission mode next to the substrate fixture monitors the overall thickness of the deposition. The optical monitor was operated at a wavelength of 650 nm, and deposition of $Ta_2O_5$ was continued until 22 quarter-wave-optical-thicknesses had been deposited on the monitored sample. These 22 quarter wave thicknesses yielded a physical coating thickness of 5 μm on the LCPDI substrate.

After the structured substrates with integral diffractive element and spacers on their surfaces (which will define the cell gap) have been prepared, they are spin coated with a linear photopolymerizable polymer (LPP) alignment coating. This coating may be a polycinnamiate polymer, commercially available as StarAlign 2100 LPP (Vantico, Inc). Vendor-defined spin coating deposition techniques are used to deposit this material. The LPP coating was cured to obtain the alignment direction by exposure to light polarized in a specific direction by either a dichroic polarizer, or, preferably, a Brewster's angle polarizer composed of a pile of 32 thin fused-silica plates, each separated by a small air gap. Similar coatings may be applied to both substrates. The LPP coating is preferred for the structured substrate devices rather than a more conventional mechanically-buffed alignment layer known in the art such as polyimide, PVA, or Nylon, since the diffractive element and spacers may be fractured or removed by mechanical shear forces applied during the buffing process.

Returning to the dye mixture, a presently preferred dye composition for operation in the visible region, specifically 543 nm, contains one positive dichroic dye (Oil Red O) and four anthraquinone-based negative dichroic dyes in the ratio of 80:20 (negative- to positive dichroic dyes). The four negative dichroic dyes may be used in equal proportions to make up the negative dichroic portion of the mixture and the total dye concentration in the LC host may be 3.5% by weight. Similarly for the near IR region, specifically 1 μm, a useful mixture composition contains six tetrasubstituted nickel dithiolene dyes with —SR terminal groups and one tetrasubstituted nickel dithiolene dye with —$Ph(CH_3)_2$ terminal groups, with the total dye concentration being 1.9% by weight.

Figure 2:
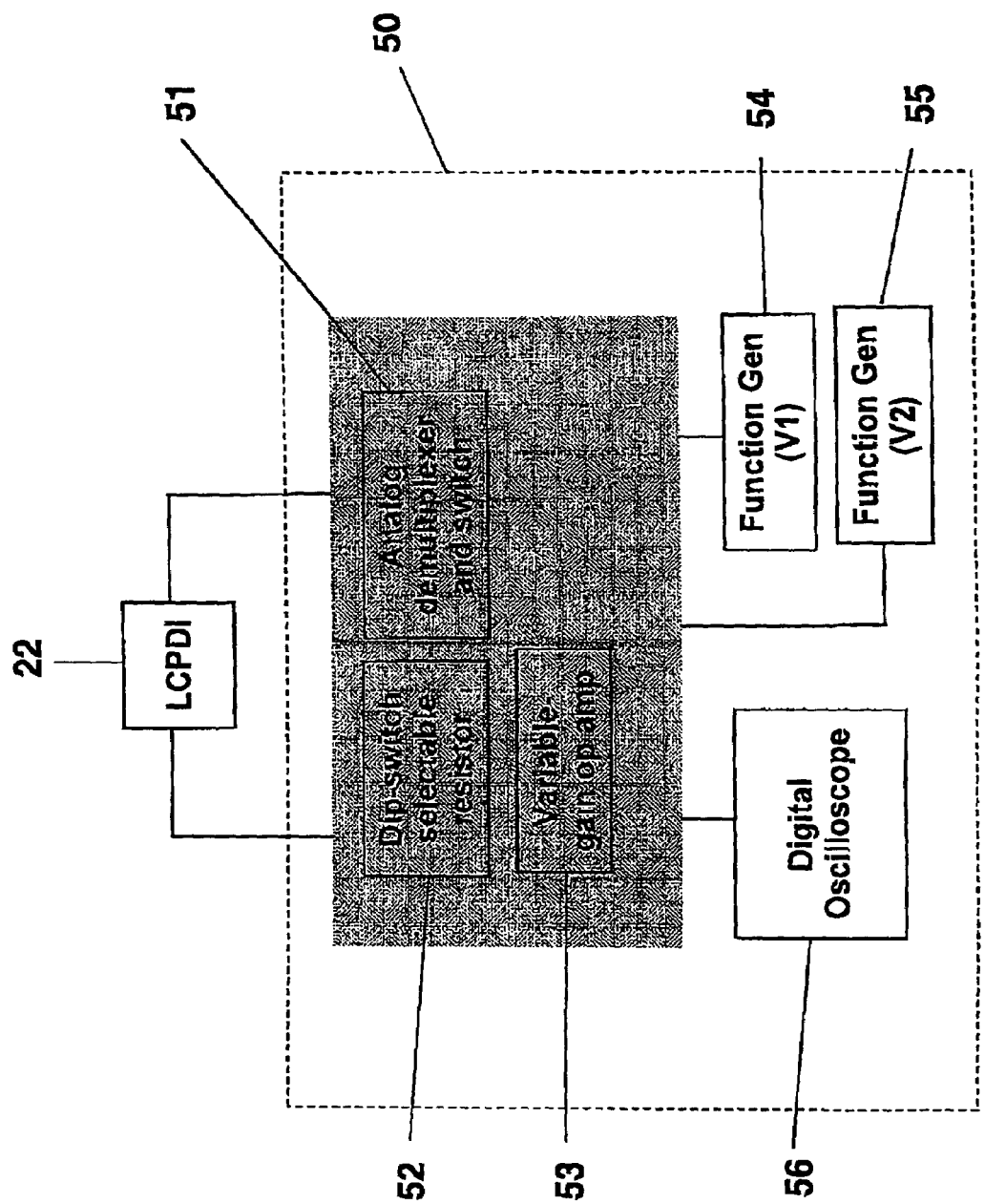
FIG. 2 is a block diagram of the LCPDI modulator driver and control electronics used in the system of FIG. 1.

Referring to FIG. 2, there is shown a block diagram of the LC modulator cell driver and control electronics package 50 illustrated in FIG. 1. The perceived dielectric constant and the index of refraction in LC materials are both related to the orientation of the LC molecules with respect to the applied electric field. Changes in cell impedance with time immediately after application of discrete voltage levels can be directly correlated with the temporal phase shift response under the same conditions and be used to control the drive voltage levels applied to the LCPDI cell 22.

The output of two identical function generators 54 and 55 are preset to voltage values $V_1$ and $V_2$, and fed into the analog demultiplexer and switch 51 that allows the drive voltage output to the LCPDI device to switch between $V_1$ and $V_2$ with a delay of only 4 ns. Cell impedance changes are determined by measuring the voltage across the dip-switch selectable series resistor 52 through the variable gain operational amplifier 53 and displaying them as a plot of current vs time using a digital oscilloscope 56, since the current is directly related to voltage and determined solely by the impedance of the cell. The typical resistor impedance value of the series resistor was around 100 ohms, and can be selectable to different values as required to match different LCPDI cells.

FIGS. 5A and 5B show the molecular structure of the Oil Red O and the anthraquinone dyes, respectively. These dyes are presently preferred for operation in the visible region of the spectrum. The terminal "R" groups range from $C_5$ to $C_9$.

The following three examples are of presently preferred visible region dye mixtures, listed in order of decreasing preference. All of the following example mixtures were prepared by adding the stated amounts of dyes to Merck E7 nematic LC host and heating the mixture to a temperature above its clearing point (68° C.) for several hours with stirring. After cooling, each mixture was filtered through a sub-micron membrane particle filter to remove insoluble solids.

EXAMPLE 1

This dye mixture was dissolved in 1 gm of E7 at a total dye concentration of 3.5% (ratio of negative-to-positive dichroic dyes is 80:20). The negative dichroic dye portion of the mixture consisted of 7 mg each of C5, C6, C7, and C8 tetrasubstituted anthraquinone dyes shown in FIG. 5B, while the positive dichroic dye portion of the mixture consisted of 7 mg of Oil Red O dye shown in FIG. 5A.

EXAMPLE 2

The total dye concentration dissolved in 1 gm of E7 was 5.1% (ratio of negative-to-positive dichroic dyes is 86.3:13.7). The negative dichroic dye portion of the mixture consisted of 8 mg each of C5, C6, and C7 tetrasubstituted anthraquinone dyes and 20 mg of a C8 tetrasubstituted anthraquinone dye. The positive dichroic dye was Oil Red O (7 mg).

EXAMPLE 3

The total dye concentration dissolved in 1 gm of E7 was 5.35% (ratio of negative-to-positive dichroic dyes is 83.2:16.8). The negative dichroic dye portion of the mixture consisted of 7.5 mg each of C5, C6, and C7 tetrasubstituted anthraquinone dyes, 20 mg of a C8 tetrasubstituted anthraquinone dye, and 2 mg of Orasol Red dye. The positive dichroic dye was Oil Red O (9 mg).

FIGS. 5C and 5D show molecular structures of organometallic transition metal dithiolene dyes with positive and negative dichroism, respectively, that are useful in preparing LCPDI cells 22 functioning in the near IR region of the spectrum. Due to the ease of synthesis, metal complexes with nickel as the central atom are preferred, but palladium and platinum can also be used, depending on the desired wavelength of operation of the LCPDI cell. The operating wavelength range of LC mixtures prepared using transition metal dithiolene dyes can range from 680 nm to 1.5 μm, depending both on the structure of the ligands (the organic portion of the complex) and the central metal atom. Because of the high molecular symmetry of the dyes shown in FIG. 5D, their dichroism is quite small and in some cases can be used to produce nearly completely contrast-compensated LCPDI mixtures without the need to add any positive dichroic dyes such as those shown in FIG. 5C. The following example discloses such a LC mixture made up entirely of weakly negative dichroic dyes of the type shown in FIG. 5D that is suitable for use in an LCPDI cell operating in the near IR region around 1 μm. The method of preparation of this mixture is identical to that used to prepare the visible region LCPDI guest-host dye mixtures described in Examples 1-3.

EXAMPLE 4

To 1 gm of E7 was added 3 mg each of six tetrasubstituted nickel dithiolene dyes shown in FIG. 5D with thioether terminal groups (—SR) including —SC4, —SC5, —SC7, —SC8, —SC9, and —SC10, and 1 mg of a tetrasubstituted nickel dithiolene dyes shown in FIG. 5D with dimethylaminophenyl [—PhN(CH$_3$))$_2$] terminal groups to yield a mixture with a total dye concentration of 1.9%.

FIG. 6, FIGS. 7A and 7B show the LCPDI cell having opposed pairs of structured substrates, each made like the structure substrate of the cell shown in FIGS. 3 and 4, but with the spacers and diffractive element on each substrate being one-half the thickness of the liquid crystal-containing fluid gap of the assembled cell. The embodiment shown in FIGS. 6, 7A and 7B may be preferred when evaporated dielectric material is used for both the spacers and the diffractive element, since it becomes increasingly difficult to evaporate inorganic thin-film structures as the desired layer thickness becomes greater than 5 μm.

From the foregoing description, it will be apparent that there have been provided improved LCPDI modulation element devices. Variations in the herein described devices and in other liquid crystal devices that may use the invention, will undoubtedly become apparent to those skilled in the art. Accordingly, the foregoing description should be taken as illustrative and not in a limiting sense.

What is claimed is:

1. A liquid crystal diffracting cell (LCDC) for a liquid crystal point diffraction interferometer (LCPDI) comprising substrates facing each other and defining said cell, at least one of said substrates having on a surface thereof facing inside said cell a diffracting object structurally integral with said one substrate, and said cell containing liquid crystal (LC) material in a gap between said substrates in said cell, and wherein said gap in said cell contains in said LC material thereof a mixture of dyes controlling the optical density presented by said cell in said LCPDI, the dichroism of which dyes are positive and negative and combine to reduce the dichroism characteristic of said dye mixture.

2. The LCDC according to claim 1 wherein said dyes have positive and negative dichroism which additively provide said reduced dichroism in said mixture with said liquid crystal material in said cell.

3. The LCDC according to claim 2 wherein said dye with negative dichroism are anthraquinone dyes and said positive dichroism dyes are selected from the group consisting of Orasol Red, Oil Red, and Sudan Red.

4. The LCDC according to claim 3 wherein said anthraquinone dyes each have from 5 to 9 carbon atoms in an appendant chain in each molecule thereof.

5. The LCDC according to claim 1 wherein said dyes in said mixture contains six tetrasubstituted nickel dithiolene dyes with —SR terminal groups and one tetrasubstituted nickel dithiolene dye with —Ph(CH$_3$)$_2$ terminal groups.

6. The LCDC according to claim 1 wherein said LCPDI functions in the near IR region, the dyes in said mixture being organometallic transition metal dithiolene dyes with positive and negative dichroism, respectively.

7. A liquid crystal diffracting cell (LCDC) for a liquid crystal point diffraction interferometer (LCPDI) comprising substrates facing each other and defining said cell, at least one of said substrates having on a surface thereof facing inside said cell a diffracting object structurally integral with said one substrate, in which said cell containing liquid crystal (LC) material in a gap between said substrates in said cell, and a plurality of spacers on said inside facing substrate surface which are spaced from each other along the edges of said surface and on which said other substrate facing inside said cell bears to define the thickness of said gap, wherein said diffracting element is a film of material defining a spot having an area less than the area of said substrates, said spot defining a step on said inside facing surface of said one substrate, said spacers and said spot are part of the same film and all are integral with said one substrate, and a layer of transparent alignment material covers said one substrate and said spacers and diffracting spot extending therefrom.

8. The LCDC according to claim 7 wherein said alignment material is an organic material curable to provide aligned molecules which align molecules of LC material in said cell.

9. The LCDC according to claim 8 wherein said alignment material is polycinnamiate having molecules set in the direction of said alignment for said LC molecules upon curing of said alignment material with polarized radiation.

10. A liquid crystal cell comprising substrates spaced from each other between which is a body of LC material containing a mixture of dyes for controlling the optical density presented by said cell, said mixture containing dyes of positive dichroism and dyes of negative dichroism in appropriate ratios which additively combine to reduce the dichroism presented by said LC mad said dyes in said cell thereby compensating for the dichroism of the individual dyes in said mixture.

11. The cell according to claim 10 wherein said dye with negative dichroism are anthraquinone dyes and said positive dichroism dyes are selected from the group consisting of Orasol Red, Oil Red, and Sudan Red.

12. The cell according to claim 11 wherein said anthraquinone dyes each have from 5 to 9 carbon atoms in an appendant chain in each molecule thereof.

13. The cell according to claim 10 wherein said dyes in said mixture contains six tetrasubstituted nickel dithiolene dyes with —SR terminal groups and one tetrasubstituted nickel dithiolene dye with —Ph(CH$_3$)$_2$ terminal groups.

14. The cell according to claim 10 wherein said cell functions in the near IR region, the dyes in said mixture being organometallic transition metal dithiolene dyes with positive and negative dichroism, respectively.

* * * * *